(12) United States Patent
Ahmadi et al.

(10) Patent No.: US 8,265,006 B2
(45) Date of Patent: Sep. 11, 2012

(54) SYNCHRONIZATION CHANNEL (PREAMBLE) STRUCTURE FOR MOBILE WORLDWIDE INTEROPERABILITY FOR MICROWAVE ACCESS (WIMAX) SYSTEMS

(75) Inventors: Sassan Ahmadi, Portland, OR (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1268 days.

(21) Appl. No.: 11/967,259

(22) Filed: Dec. 31, 2007

(65) Prior Publication Data

US 2009/0168745 A1 Jul. 2, 2009

(51) Int. Cl.
*H04W 4/00* (2009.01)
(52) U.S. Cl. ........................... 370/328; 370/509
(58) Field of Classification Search .......... 370/328–329, 370/331, 338, 350, 476, 503, 507, 509–510, 370/512–514, 335–336, 342–343, 345, 437, 370/441–442, 465; 455/456.1, 456.5–456.6, 455/458
See application file for complete search history.

(56) References Cited

U.S. PATENT DOCUMENTS

| | | | |
|---|---|---|---|
| 7,010,306 B1 * | 3/2006 | Tanibayashi et al. ...... | 455/456.1 |
| 7,843,886 B2 * | 11/2010 | Johnson et al. ................ | 370/332 |
| 2003/0099312 A1 * | 5/2003 | Gummadi et al. ............ | 375/343 |
| 2003/0119501 A1 * | 6/2003 | Kim ............................... | 455/433 |
| 2003/0195044 A1 * | 10/2003 | Narita .............................. | 463/43 |
| 2004/0147258 A1 * | 7/2004 | Dokko ........................... | 455/428 |
| 2006/0003767 A1 * | 1/2006 | Kim et al. ...................... | 455/436 |
| 2006/0009241 A1 * | 1/2006 | Ryu et al. ....................... | 455/458 |
| 2006/0182000 A1 * | 8/2006 | McNiece ................... | 369/112.1 |
| 2008/0095115 A1 * | 4/2008 | Jung .............................. | 370/331 |
| 2008/0232528 A1 * | 9/2008 | Imamura et al. .............. | 375/365 |
| 2008/0285526 A1 * | 11/2008 | Gorokhov et al. ............ | 370/338 |
| 2009/0052571 A1 * | 2/2009 | Liu et al. ........................ | 375/267 |
| 2009/0111451 A1 * | 4/2009 | Okita et al. .................... | 455/418 |
| 2009/0131098 A1 * | 5/2009 | Khandekar et al. ........... | 455/525 |
| 2009/0143076 A1 * | 6/2009 | Wachter et al. ............ | 455/456.1 |
| 2010/0002617 A1 * | 1/2010 | Seyama ........................ | 370/312 |
| 2010/0172267 A1 * | 7/2010 | Viorel et al. ................... | 370/254 |
| 2010/0210266 A1 * | 8/2010 | Laroia et al. .................. | 455/436 |
| 2011/0310791 A1 * | 12/2011 | Prakash et al. ................ | 370/315 |

* cited by examiner

*Primary Examiner* — Chi H. Pham
*Assistant Examiner* — Kevin Mew
(74) *Attorney, Agent, or Firm* — Kacvinsky Daisak, PLLC

(57) ABSTRACT

Various embodiments are directed to a synchronization channel or preamble structure that may be used in mobile WiMAX systems designed to operate in accordance with the IEEE 802.16e-2005 standard and/or the evolving IEEE 802.16m standard. In one embodiment, the synchronization channel (preamble) structure may comprise a base station group identifier field to store a k-bit base station group identifier, a base station identifier field to store an m-bit base station identifier, and a sector identifier field to store an n-bit sector identifier. The base station group identifier may be associated with a paging group identifier in a wireless communications system such as mobile WiMAX network. Other embodiments are described and claimed.

16 Claims, 4 Drawing Sheets

SYNCHRONIZATION CHANNEL (PREAMBLE) STRUCTURE FOR MOBILE WORLDWIDE INTEROPERABILITY FOR MICROWAVE ACCESS (WIMAX) SYSTEMS

BACKGROUND

Mobile Worldwide Interoperability for Microwave Access (WiMAX) is a broadband wireless technology for fixed and mobile broadband networks to enable broadband data services including data, streaming video, and voice. The robustness to severe interference and fast detection of the synchronization channel or synchronization preamble is crucial to fast cell selection, system timing and frequency acquisition, cell coverage, and cell edge performance, as well as scan latency for the mobile stations.

Mobile WiMAX systems may operate in accordance with standards such as the Institute for Electronic and Electrical Engineers (IEEE) 802.16e-2005 standard, "Air Interface for Fixed and Mobile Broadband Wireless Access Systems," (February, 2005) and, its evolution, the IEEE 802.16m standard, "Advanced Air Interface." The IEEE 802.16e (mobile WiMAX) standard specifies a non-hierarchical scheme to detect the cell identifier (Cell-ID), but does not have a structured preamble. Namely, the distinct binary sequences (e.g., 114 binary sequences for 19 cells×6 sectors/cell) that occupy the first Orthogonal Frequency Division Multiple Access (OFDMA) symbol of each radio frame and span over the entire available system bandwidth using every third sub-carrier only carry the Cell-ID information.

DETAILED DESCRIPTION

Various embodiments are directed to a synchronization channel (or preamble) structure that may be used in mobile WiMAX systems designed to operate in accordance with the IEEE 802.16e-2005 standard and/or the evolving IEEE 802.16m standard. The synchronization channel (preamble) structure is suitable and extensible to support the IEEE 802.16e-2005 standard as well as the evolving IEEE 802.16m standard or the next generations of mobile WiMAX.

Figure 1:
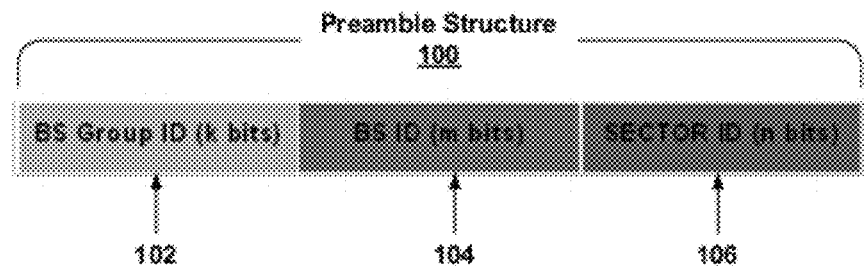
FIG. 1 illustrates a synchronization channel preamble structure in accordance with various embodiments.

FIG. 1 illustrates one embodiment of a synchronization channel or preamble structure 100. In various implementations, the synchronization channel (preamble) structure 100 may support the enhanced and advanced features of the IEEE 802.16m standard or the next generation of mobile WiMAX including support of multi-hop relays, support of variable bandwidth terminals, enhanced multicast and broadcast service, efficient paging, extended cell sizes, lower scan latency, and so forth. In some cases, the synchronization channel (preamble) structure 100 may be used in stand alone mode for green field deployments. In addition, the synchronization channel (preamble) structure 100 may support the backward compatibility of and use in conjunction with the legacy preamble in accordance with IEEE 802.16e, whenever and wherever legacy base stations or terminals exist.

In comparison to the legacy preamble, the synchronization channel (preamble) structure 100 may occupy one OFDMA symbol and spans over the minimum system bandwidth (e.g., 5 MHz in IEEE 802.16m), as opposed to the entire bandwidth. Therefore, mobile stations with different bandwidths can all detect and decode the synchronization channel (preamble) structure 100. The synchronization channel (preamble) structure 100 also allows structured search algorithms to be implemented that significantly reduce the scan latency and cell selection, whereas no structured search is feasible based on the legacy preamble.

The synchronization channel (preamble) structure 100 has attendant advantages over structures used in competing air-interface standards such as IEEE 802.16e, 3GPP LTE, and IEEE 802.20. For example, the design of the synchronization channel (preamble) structure 100 allows single-step detection of a base station group identifier (BS Group ID), a base station identifier (BS ID), and a sector identifier (Sector ID) as opposed to the three-step hierarchical approach used in 3GPP LTE. In addition, the BS Group ID may be associated with a paging group or paging group identifier (Paging Group ID) to significantly improve the paging of mobile stations in the idle-mode (or idle state) and to reduce the signaling overhead of the common control channel (CCCH) or the medium access protocol (MAP).

In various embodiments, the synchronization channel (preamble) structure 100 may comprise or be implemented as a data structure for a binary sequence. As shown in FIG. 1, the synchronization channel (preamble) structure 100 may comprise a data structure including a BS Group ID field 102 to store a sequence of bits corresponding to a BS Group ID, a BS ID field 104 to store a sequence of bits corresponding to a BS ID, and a Sector ID field 106 to store a sequence of bits corresponding to a Sector ID.

In an exemplary embodiment of the synchronization channel (preamble) structure 100, the BS Group ID field 102 may be arranged to store a BS Group ID comprising k bits, the BS ID field 104 may be arranged to store a BS ID comprising m bits, and the Sector ID field 106 may be arranged to store a Sector ID comprising n bits, where k, m, and n each may represent any positive integer value in accordance with the described embodiments. In this exemplary embodiment, therefore, each sequence of the synchronization channel (preamble) structure 100 carries (k+m+n) bits of information requiring the design of $2^{(k+m+n)}$ unique sequences. It can be appreciated that the unique sequences may be designed and implemented using various suitable techniques in accordance with the described embodiments.

Due to physical layer constraints, the size of the binary sequences and the total number of bits carried by each sequence may be limited. In an exemplary embodiment, a (k+m+n) bit synchronization channel preamble sequence may comprise twelve bits with values of k=5, m=4, and n=3. Considering the number of available sub-carriers per one OFDMA symbol for a minimum bandwidth 5 MHz, Nused=420<NFFT=512, as specified by the IEEE 802.16m system requirement document, a binary sequence of k+m+n=12 may be recommended. It can be appreciated that other sizes and combinations of values may be used depending on the number of available sub-carriers, minimum bandwidth, the characteristics of the preamble sequences, performance requirements of the system including but not limited to robustness to inter-cell interference, and other factors.

In various implementations, the synchronization channel (preamble) structure 100 may be communicated within a mobile WiMAX system operating in accordance with the IEEE 802.16e-2005 standard and/or the evolving IEEE 802.16m standard. The mobile WiMAX system may comprise a plurality of base station groups, with each base station group including a plurality of base stations. Each base station may be associated with a plurality of sectors within a coverage area or cell for the particular base station. The mobile WiMAX system also may comprise one or more mobile stations arranged to communicate with one or more base stations and/or one or more base station groups.

It can be appreciated that while exemplary embodiments may be described in the context of mobile WiMAX systems and/or the IEEE 802.16e-2005 and IEEE 802.16m standards for purposes of illustration, the aspects and advantages described herein may be applicable to improve other wireless communications systems and standards in accordance with the described embodiments. For example, some embodiments may be compatible with devices and/or networks operating in accordance with existing IEEE 802.11, 802.11a, 802.11b, 802.11e, 802.11g, 802.11h, 802.11i, 802.11n, 802.16, 802.16d, 802.16e standards as well as their future versions, derivatives, or evolution of the above standards.

Within a mobile WiMAX system, the synchronization channel (preamble) structure 100 may be used in accordance with structured search and detection procedures implemented by a mobile station. For example, an IEEE 802.16m or next generation mobile WiMAX compliant mobile station may frequently scan neighboring base stations and detect a (k+m+n) bit preamble sequence implemented by the synchronization channel (preamble) structure 100. To reduce computational complexity, the sequence may be required to be a binary sequence (composed of +1 and −1) in some implementations.

In various embodiments, the synchronization channel (preamble) structure 100 may allow the mobile station to detect a particular BS Group ID, a particular BS ID, and a particular Sector ID from the binary sequence in a single step. It can be appreciated that detecting all of the BS Group ID, the BS ID, and the Sector ID in a single step or scan can significantly reduce the detection latency both in the connected and idle states. Especially in the idle state, this quick detection capability can save much needed power at the mobile station. It is also noted that the single-step detection capability provided by the design of the synchronization channel (preamble) structure 100 improves over conventional multi-step hierarchical approaches. Additionally, in cases where a relay station is used in the network for coverage enhancement and extension, some BS ID codes may be reserved to distinguish a relay station from a base station so that the mobile station may determine whether it is being served by a base station or a relay station.

The synchronization channel (preamble) structure 100 may allow the mobile station to search for and identify a particular base station group by comparing the k bits of the binary sequence to known k-bit sequences of base station groups and using a maximum number of $2^k$ comparisons to identify the particular base station group from $2^k$ base station groups. In various embodiments, the first k bits (from left to right) of a received binary sequence correspond to the BS Group ID, and $2^k$ cross-correlations are performed with known k-bit sequences associated with base station groups. When the search is successfully performed, it is determined that the sequence belongs to one base station group out of $2^k$ base station groups.

The synchronization channel (preamble) structure 100 may allow the mobile station to search for and identify a particular base station by comparing the m bits of the binary sequence to known m-bit sequences of base stations and using a maximum number of $2^m$ comparisons to identify the particular base station from $2^m$ base station groups. In various embodiments, the m bits following the first k bits (from left to right) of a received binary sequence correspond to the BS ID, and $2^m$ cross-correlations are performed with known m-bit sequences associated with base stations. When the search is successfully performed, it is determined that the sequence belongs to one base station out of $2^m$ base stations.

The synchronization channel (preamble) structure 100 may allow the mobile station to search for and identify a particular sector by comparing the n bits of the binary sequence to known n-bit sequences of sectors and using a maximum number of $2^n$ comparisons to identify the particular sector from $2^n$ sectors. In various embodiments, the last n bits (from right to left) of a received binary sequence correspond to the Sector ID, and $2^n$ cross-correlations are performed with known n-bit sequences associated with sectors. When the search is successfully performed, it is determined that the sequence belongs to one sector out of $2^n$ sectors.

The synchronization channel (preamble) structure 100 may allow the mobile station to identify a particular base station group, a particular base station, and a particular sector from the binary sequence by performing a maximum number of $2^k+2^m+2^n$ comparisons. In various embodiments, after conducting $2^k+2^m+2^n$ cross-correlations or other detection and/or comparison techniques, the mobile station determines that the detected sequence belongs to a particular sector of a particular base station of a particular base station group.

It can be appreciated that number of required cross-correlations $2^k+2^m+2^n$ is significantly lower than $2^{(k+m+n)}$ required when performing a full search of (k+m+n)-bit sequences in each scan using techniques based on the IEEE 802.16e preamble. For example, the structured preamble code of the synchronization channel (preamble) structure 100 eliminates the need to conduct a full search of all possible Cell-ID candidates in each frame, reducing the computational complexity of preamble detection. Furthermore, while the IEEE 802.16e preamble contains only Cell-ID information, the synchronization channel (preamble) structure 100 allows extracting more information from the detected sequence while performing a structured search.

The synchronization channel (preamble) structure 100 may allow the mobile station to associate the BS Group ID with a paging group or Paging Group ID. In various embodiments, the BS Group ID may be associated with a paging group such as a group of base stations sending paging messages to a specific mobile station in their coverage area during idle-mode. In such embodiments, the timing acquisition procedure that is performed every M frames (M=1, 2, 3, . . . ) and the detection of the Paging Group ID during idle-mode are simplified and combined, thus eliminating additional signaling that currently is involved in communicating the Paging Group ID (as the ID may change due to movement of the mobile station to another paging group) to the mobile station during idle-mode. It can be appreciated that the preamble code structure is more efficient as compared to IEEE 802.16e taking into account not only the detection of the sector ID and BS ID, but also the paging groups and may significantly improve the power saving of the mobile stations in the idle state.

In the event that there are multiple paging groups to which a base station belongs, the BS Group ID in the preamble may refer to one of the paging groups such as a primary paging group of which the base station is a part. Furthermore, the most significant bit of the BS Group ID may be set to indicate that the BS is part of multiple paging groups. It is noted that the capability of associating base station groups with paging groups is not supported by competing air-interface standards such as 3GPP LTE.

The synchronization channel (preamble) structure 100 may allow the mobile station to detect a handoff condition. In various embodiments, association of base station groups or BS Group IDs with paging groups or Paging Group IDs may allow faster and more efficient mobile-initiated handoff and idle-mode paging protocols. For example, the synchronization channel (preamble) structure 100 may reduce mobile-initiated handoff interruption time by allowing the mobile station to determine a handoff condition and initiate the handoff procedure based on the change in Sector ID, BS ID, or BS Group ID during each scan even if in the active or connected state. It is noted that such feature does not exist in the IEEE 802.16e preamble.

The synchronization channel (preamble) structure 100 may allow the mobile station to track the rate of changes for one or more of the BS Group ID, the BS ID, and the Sector ID for error detection and improved reliability. In various embodiments, the synchronization channel (preamble) structure 100 may improve correct detection of the preamble sequence based on the rate of change for different sections of the preamble code due to mobility of the terminal. For example, when the mobile station traverses different sectors, base stations, and base station groups in the network and performs the scanning to select the sector (or base station) with the strongest signal, the Sector ID part of the sequence code has more probability of change from one scan to another than the BS ID part and the BS Group ID part of the preamble code. An error can be detected by tracking whether different parts of the sequence code change irregularly or unexpectedly. It is noted that such feature improves the reliability of preamble detection and does not exist in IEEE 802.16e preamble.

Figure 2:
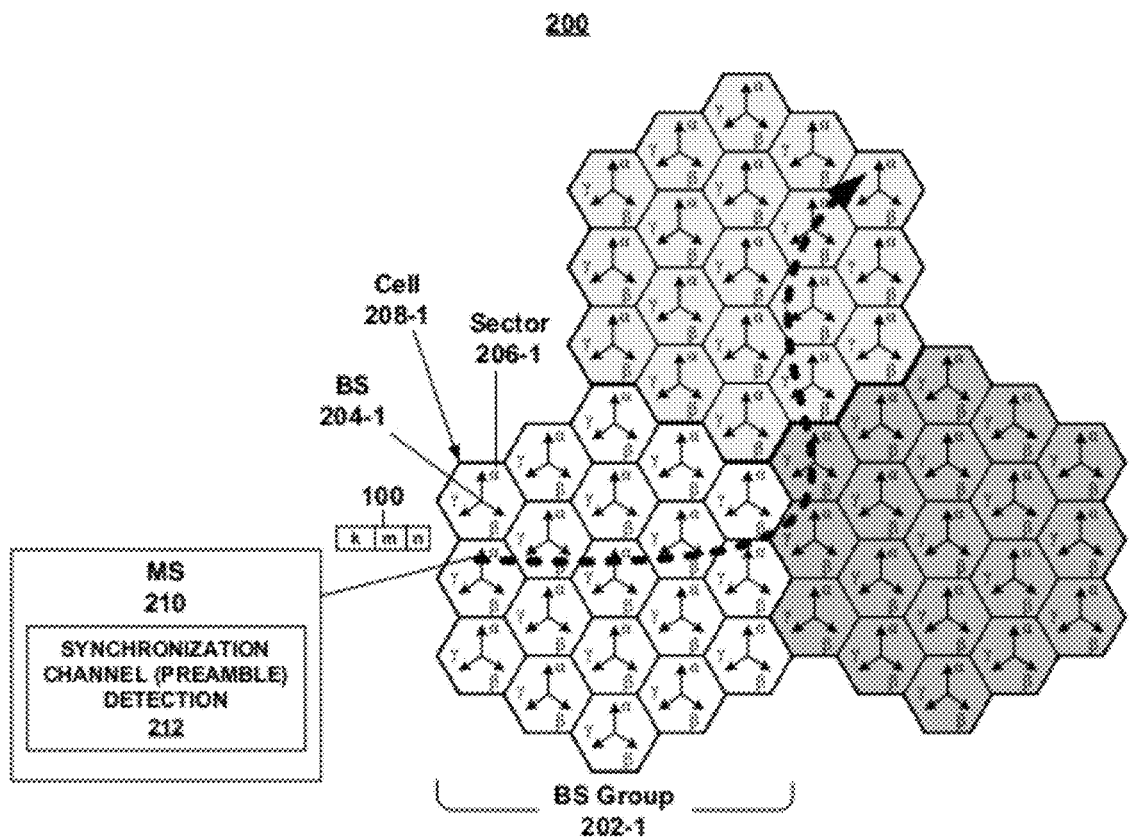
FIG. 2 illustrates a mobile WiMAX network comprising base station groups, base stations within each base station group, and sectors within each base station and hypothetical trajectory of a mobile station in accordance with various embodiments.

FIG. 2 illustrates one embodiment of a mobile WiMAX network 200. In various implementations, the mobile WiMAX network 200 may operate in accordance with the IEEE 802.16e-2005 standard and/or the evolving IEEE 802.16m standard. It can be appreciated that aspects and advantages described herein may be applicable to improve other wireless communications systems and standards.

The mobile WiMAX network 200 may support various communication and/or modulation techniques such as Frequency Division Multiplexing (FDM), Orthogonal FDM (OFDM), Orthogonal Frequency Division Multiple Access (OFDMA), Scalable OFDMA (S-OFDMA), Coded OFDM (COFDM), Time Division Multiplexing (TDM), Time Division Multiple Access (TDMA), Extended TDMA (E-TDMA), Time-Division Duplex (TDD), Frequency Division Duplex (FDD), Quadrature Phase Shift Keying (QPSK), Offset QPSK (OQPSK), Differential QPSK (DQPSK), Quadrature Amplitude Modulation (QAM), N-state QAM (N-QAM), Differential QAM (DQAM), and others.

The mobile WiMAX network 200 may employ various coding techniques such as CRC, Forward Error Correction (FEC), Automatic Repeat Request (ARQ), Hybrid ARQ (HARQ), Fast Channel Feedback, Convolution Code (CC), Convolution Turbo Code (CTC), Block Turbo Code, Low Density Parity Code Check (LDPC), and others.

The mobile WiMAX network 200 may support various encryption techniques such as Advanced Encryption Standard (AES) encryption, Advanced Access Content System (AACS) encryption, Data Encryption Standard (DES) encryption, Triple DES (3DES) encryption, Rivest, Shamir, and Adleman (RSA) encryption, Elliptic curve cryptography (ECC) encryption, and others.

The mobile WiMAX network 200 may utilize various antenna techniques such as Multiple Input Multiple Output (MIMO), Adaptive MIMO (A-MIMO), Single Input Multiple Output (SIMO), Multiple Input Single Output (MISO), Adaptive or Advanced Antenna System (AAS), and/or other intelligent or multiple antenna technology.

The mobile WiMAX network 200 may provide voice and/or data communications functionality in accordance with different types of systems such as Code Division Multiple Access (CDMA) systems, Global System for Mobile Communication (GSM) systems, North American Digital Cellular (NADC) systems, OFDMA systems, TDMA systems, E-TDMA systems, Narrowband Advanced Mobile Phone Service (NAMPS) systems, 3G systems such as Wide-band CDMA (WCDMA), CDMA-2000, and Universal Mobile Telephone System (UMTS) systems, GSM with GPRS systems (GSM/GPRS), CDMA/1xRTT systems, Enhanced Data Rates for Global Evolution (EDGE) systems, EV-DO systems, Evolution For Data and Voice (EV-DV) systems, High Speed Downlink Packet Access (HSDPA) systems, High Speed Uplink Packet Access (HSUPA) systems, Multi-Carrier Modulation (MDM) systems, Discrete Multi-Tone (DMT) system, Bluetooth® system, ZigBee™ system, and others.

The mobile WiMAX network 200 may communicate, manage, or process information in accordance with one or more protocols such as MAC protocol, Physical Layer (PHY) protocol, Physical Layer Convergence Protocol (PLCP), Dynamic Host Configuration Protocol (DHCP), File Transfer Protocol (FTP), Trivial FTP (TFTP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), Multipurpose Internet Mail Extensions (MIME) protocol, Gateway Control Protocol, Media Gateway Control Protocol (MGCP), Simple Gateway Control Protocol (SGCP), Session Announcement Protocol (SAP), Session Description Protocol (SDP), Session Initiation Protocol (SIP), Remote Voice Protocol (RVP), RVP Control Protocol (RVPCP), Real Time Streaming Protocol (RTSP), Real-time Transport Protocol (RTP), Synchronized Multimedia Integration Language (SMIL) protocol, Internet Streaming Media Alliance (ISMA) protocol, and others.

The mobile WiMAX network 200 may comprise one or more base stations and one or more mobile stations which may be implemented as hardware, software, or any combination thereof, as desired for a given set of design parameters or performance constraints. A base station may comprise or be implemented as a wireless device or system such as a WiMAX base station, relay station (RS), mobile multi-hop relay BS (MMR-BS), network hub, gateway, router, and so forth. A mobile station may comprise or be implemented as wireless device or system such as a wireless client device, user terminal, laptop computer, portable computer, personal computer (PC), notebook PC, handheld computer, server computer, personal digital assistant (PDA), cellular telephone, combination cellular telephone/PDA, VoIP telephone, smart phone, pager, messaging device, media player, digital music player, game device, set-top box (STB), appliance, customer premises equipment (CPE), wireless access point (AP), a modem, Global Positioning System (GPS) device, Location Based Services (LBS) device, navigation system, and others.

In general, a wireless device or system may comprise one more wireless interfaces and/or components for wireless communication such as one or more transmitters, receivers, transceivers, chipsets, amplifiers, filters, control logic, network interface cards (NICs), antennas, and so forth. Examples of a transceiver may include a MIMO transceiver, SIMO transceiver, MISO transceiver, Multi Receiver Chain (MRC) transceiver, and so forth. Examples of an antenna may include an internal antenna, an external antenna, a monopole antenna, a meandered monopole antenna, a dipole antenna, a balanced antenna, a printed helical antenna, a chip antenna, a ceramic antenna, a planar inverted-F antenna (PIFA), a helical antenna, an end fed antenna, an omni-directional antenna, a circularly polarized antenna, a micro-strip antenna, a diversity antenna, a dual antenna, an antenna array, and others.

A base station and a mobile station may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner.

The media and control information may be communicated from and to a number of different devices or networks. In various implementations, the media information and control information may be segmented into a series of packets. Each packet may comprise, for example, a discrete data set having a fixed or varying size represented in terms of bits, bytes, octets, and so forth. It can be appreciated that aspects of the described embodiments may be applicable to various types of communication content or format, such as frames, fragments, cells, windows, units, and others.

In various embodiments media and control information may be communicated over a wireless communication channel between a base station and a mobile station. Examples of a wireless communication channel may include, without limitation, a radio channel, infrared channel, radio-frequency (RF) channel, a portion of the RF spectrum, and/or one or more licensed or license-free frequency bands. The wireless communication channel may be arranged to support one or more point-to-point connections between a base station and a mobile station. Multiple connections may share resources (bandwidth, time, frequency, code, and space) of the physical wireless communication channel.

The wireless communication channel between a base station and a mobile station may support various types of transmission such as unicast transmission between a sender and a specified recipient (e.g., point-to-point), multicast transmission between a sender and multiple specified recipients (e.g., point-to-multipoint), broadcast transmission between a sender and all recipients within a coverage area, and others. The type of connection may be defined according to the type of data to be transmitted and/or direction of the data traffic flow.

Although FIG. 2 may show a limited number of and particular types of devices by way of example, it can be appreciated that the mobile WiMAX network 200 may include additional devices for a given implementation. For example, a base station may form part of an Access Service Network (ASN) and be coupled to an Access Service Network Gateway (ASN-GW). The ASN-GW may couple the base station to a Connectivity Service Network (CSN) comprising content services, support systems, routers, servers (e.g., application servers, AAA servers, DNS/DHCP servers), user databases, gateway devices, and other components. CSN may access other CSNs, Application Service Provider (ASP) networks, and/or the Internet. In some embodiments, a mobile station may form part of or connect to a network such as a Local Area Network (LAN), a Wireless LAN (WLAN), a Wireless Fidelity (WiFi) network, a Metropolitan Area Network (MAN), a Wireless MAN (WMAN), a Wide Area Network (WAN), a Wireless WAN (WWAN), a Personal Area Network (PAN), a Wireless PAN (WPAN), and so forth.

As shown, the mobile WiMAX network 200 may comprise a plurality of base station groups (e.g., BS Group 202), with each base station group including a plurality of base stations (e.g., BS 204-1). Each base station (e.g., BS 204-1) may be associated with a plurality of sectors (e.g., sector 206-1) denoted as α, β, and γ within a coverage area or cell (e.g., cell 208-1) for the particular base station (e.g., BS 204-1). The mobile WiMAX network 200 also may comprise one or more mobile stations (e.g., MS 210) arranged to communicate with one or more base stations (e.g., NS 204-1) and/or one or more base station groups (e.g., BS Group 202).

For clarity and ease of understanding, various embodiments may refer to a particular base station group (e.g., BS Group 202), base station (e.g., 204-1), sector (sector 206-1), cell (e.g., cell 208-1), and mobile station (e.g., MS 210). It can be appreciated, however, that the described embodiments may be applicable to various base station groups, base stations, cells, sectors, and mobile stations in accordance with the described embodiments.

Furthermore, while FIG. 2 may show a particular number of base station groups, base stations and/or cells of base station groups, sectors associated with base stations, and mobile stations by way of example, it can be appreciated that the mobile WiMAX network 200 may include any number of base station groups, base stations, sectors, cells, and mobile stations in accordance with the described embodiments.

As shown, the MS 210 may comprise or implement a synchronization channel (preamble) detection module 212 arranged to perform various operations in accordance with the described embodiments. It can be appreciated that the synchronization channel (preamble) detection module 212 may be embodied by various hardware components, software components, firmware components, and/or combination thereof for a particular implementation. For example, the synchronization channel (preamble) detection module 212 may be implemented executable logic (e.g., software, firmware, instructions, code, etc.) to be executed by a logic device (e.g., computer, processor, controller, IC, etc.). Executable logic may be stored internally or externally to a logic device on one or more types of computer-readable storage media such as volatile or non-volatile memory, removable or non-removable memory, erasable or non-erasable memory, writeable or re-writeable memory, and so forth.

It also is to be appreciated that the described embodiments illustrate exemplary implementations, and that the functional components and/or modules may be implemented in various other ways in accordance with the described embodiments. Furthermore, the operations performed by such components or modules may be combined and/or separated for a given implementation and may be performed by a greater number, fewer number, and/or different types of components or modules.

In order to establish a wireless communication channel for communicating information within the mobile WiMAX network 200, the BS 204-1 and the MS 210 may perform various required operations such as synchronization, ranging, capability negotiation, authentication, registration, and IP connectivity to enable network access.

As part of the synchronization operation, the MS 210 may scan for and detect a (k+m+n) bit preamble sequence implemented by the synchronization channel (preamble) structure 100. From the synchronization channel (preamble) structure 100, the MS 210 may detect a particular BS Group ID, a particular BS ID, and a particular Sector ID from the binary sequence in a single step. The MS 210 may search for and identify a particular base station group, base station, and sector from the binary sequence. For example, when the search is successfully performed, the MS 210 may determine that the sequence belongs to Sector 206-1 of BS 204-1 of BS Group 202-1.

In some embodiments, the BS Group ID for the BS Group 202-1 may be associated with a paging group of Paging Group ID to improve the power saving of the MS 210 in the idle state. In various implementations, association of the BS Group ID with a paging group may allow the MS 210 to determine a handoff condition and initiate the handoff procedure based on a change in the Sector ID, BS ID, or BS Group ID during each scan even if in the active or connected state.

In various embodiments, the MS 210 may use the synchronization channel (preamble) structure 100 to improve correct detection of the preamble sequence based on the rate of change for different sections of the preamble code. For example, when the MS 210 traverses different sectors, base stations, and base station groups according to a trajectory (indicated by the dashed line) and performs scanning to select the sector (or base station) with the strongest signal, the MS 210 may track whether one or more of the BS Group ID, BS ID, and Sector ID changes irregularly or unexpectedly. It can be appreciated that the Sector ID has a greater probability of change from one scan to another relative to the BS ID and the BS Group ID.

Figure 3:
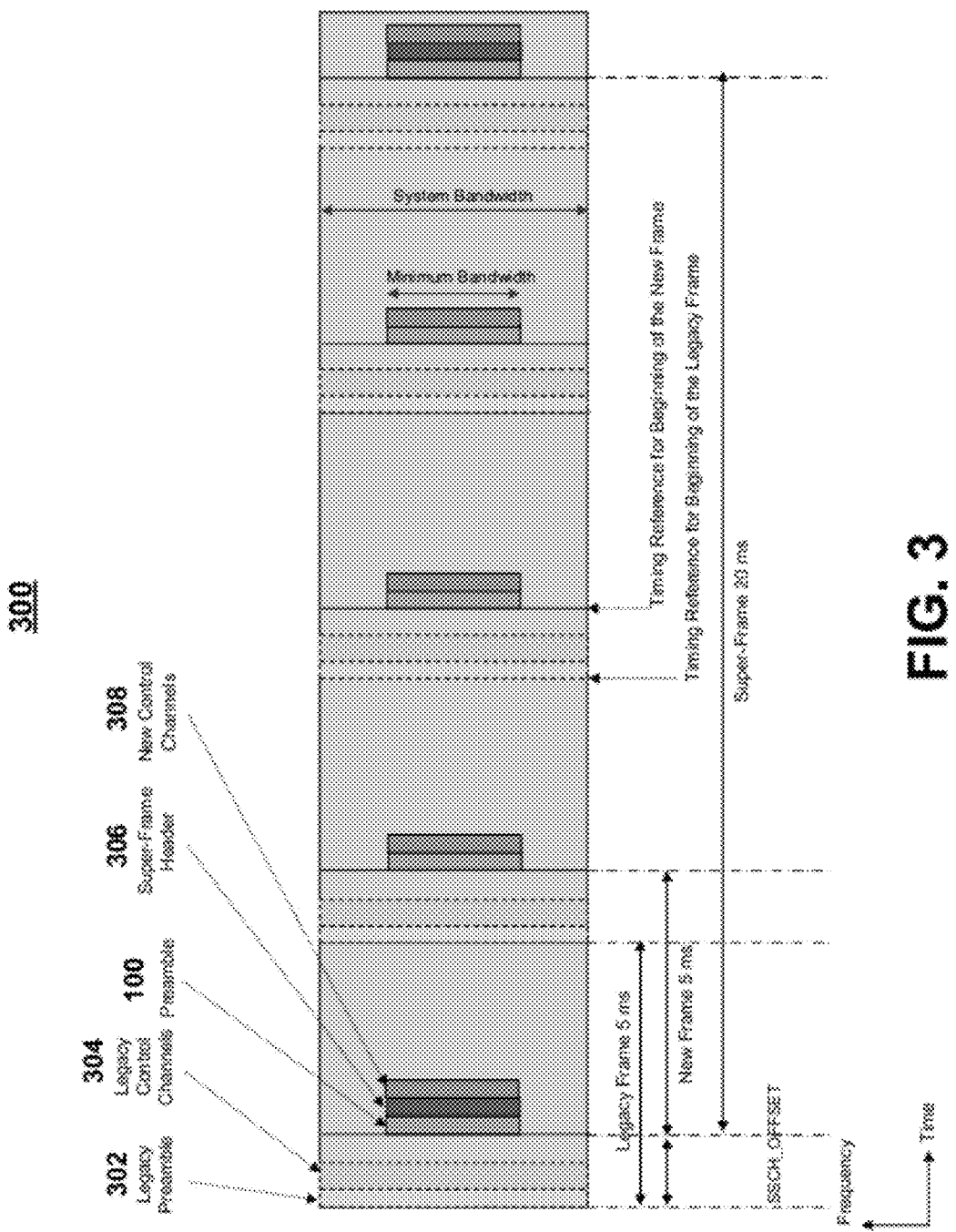
FIG. 3 illustrates a frame structure including the location of the legacy and the new synchronization channels in accordance with various embodiments.

FIG. 3 illustrates one embodiment of a frame structure 300 comprising the synchronization channel (preamble) structure 100 as described above. In various implementations, the frame structure 300 may comprise an OFDMA frame structure to be communicated in accordance with OFDMA techniques which involve multiplexing operations for subdividing bandwidth into multiple frequency subcarriers. The OFDMA frame structure may include multiple permutation zones comprising a number of contiguous OFDMA symbols that use the same permutation scheme. Time Division Multiplexing (TDM) technique may be used to separate permutation zones supported by legacy systems from the new permutation zones supported by IEEE 802.16m or next generation mobile WiMAX systems.

In order to minimize the impact on the physical layer overhead (layer 1 overhead), the synchronization channel (preamble) structure 100 may be implemented within the frame structure 300 by a synchronization channel comprising a secondary or supplemental synchronization channel (SSCH). The SSCH may comprise one or more symbols (e.g., OFDMA symbols) and may appear in every frame (e.g., OFDMA frame) or in every certain integer number of frames (e.g., super-frame). In various embodiments, the SSCH may occupy one OFDMA symbol every frame or every integer number of frames and may span over the minimum system bandwidth (e.g., 5 MHz). It can be appreciated that this scalable structure in the frequency domain allows support of mobile stations with different bandwidth.

In various embodiments, the frame structure 300 may support the SSCH as well as a primary synchronization channel (PSCH) such as a legacy synchronization channel operating in accordance with IEEE 802.16e. As shown, the frame structure 300 may comprise a legacy preamble 302 and legacy control channels 304 as well as the synchronization channel (preamble) structure 100, a super-frame header 306, and control channels 308. In an exemplary embodiment, the frame structure 300 may comprise a Time Division Duplex (TDD) backward compatible frame structure where the SSCH and the PSCH each occupy one OFDMA symbol and where the synchronization channel (preamble) structure 100 appears every M frames (M=1, 2, 3 . . . ). In comparison to the legacy preamble 302 (e.g., IEEE 802.16e preamble), the synchronization channel (preamble) structure 100 spans over the minimum system bandwidth (e.g., 5 MHz), as opposed to the entire bandwidth. It must be noted that the preamble structure and the associated concepts described herein can be equally applied to Time Division Duplex (TDD), Frequency Division Duplex (FDD), and Half-Duplex FDD operation modes. The use of a TDD frame structure in the illustration is only an example and shall not be interpreted as limiting for this concept.

It can be appreciated that it may be necessary to distinguish the SSCH from the PSCH so that the described embodiments are compatible with legacy devices and/or networks as well as with devices and/or networks operating in accordance with evolving or future mobile WiMAX standards (e.g., IEEE 802.16m).

In various embodiments, the SSCH may be offset from the PSCH by a fixed number of symbols (e.g., 12 symbols) within a frame. The offset may be controlled, for example, by a system parameter (e.g., FRAME_OFFSET) that defines a value specifying the position of the SSCH relative to the PSCH. The parameter may be defined to specify a number of symbols between zero and a maximum value (e.g., FRAME_OFFSET=0 . . . L OFDM symbols). The default value of the parameter may be five symbols (e.g., FRAME_OFFSET=12) for IEEE 802.16m systems with legacy support and zero symbols (e.g., FRAME_OFFSET=0) for green-field IEEE 802.16m systems. In various implementations, the parameter is fixed across the network and is not to be changed due to consideration for fixed system timing.

Figure 4:
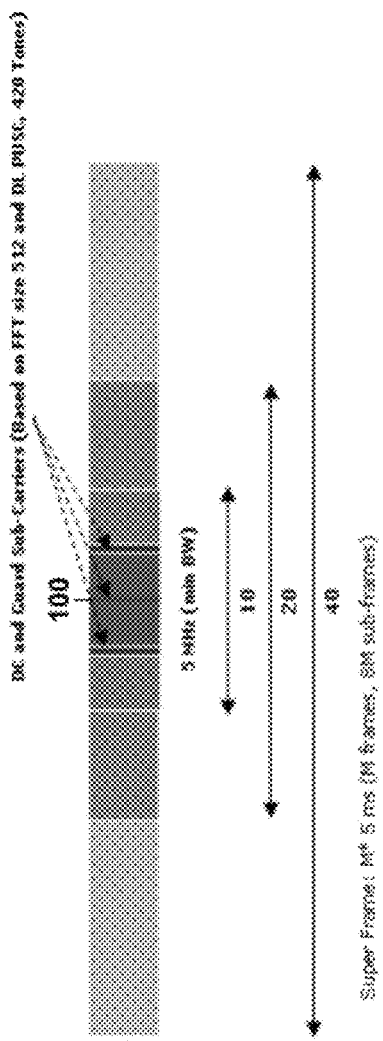
FIG. 4 illustrates a frequency-domain structure for a synchronization channel in accordance with various embodiments.

FIG. 4 illustrates one embodiment of a frequency-domain structure 400 for the SSCH. As shown, the synchronization channel (preamble) structure 100 occupies the center of the RF channel. In various embodiments, the RF channel may comprise a 5 MHz RF channel using the OFDMA parameters specified by IEEE 802.16e. In such embodiments, mobile stations with wider bandwidths (e.g., as large as 40 MHz) can also detect the SSCH and therefore acquire the system timing and other information contained in the synchronization channel (preamble) structure 100.

Figure 5:
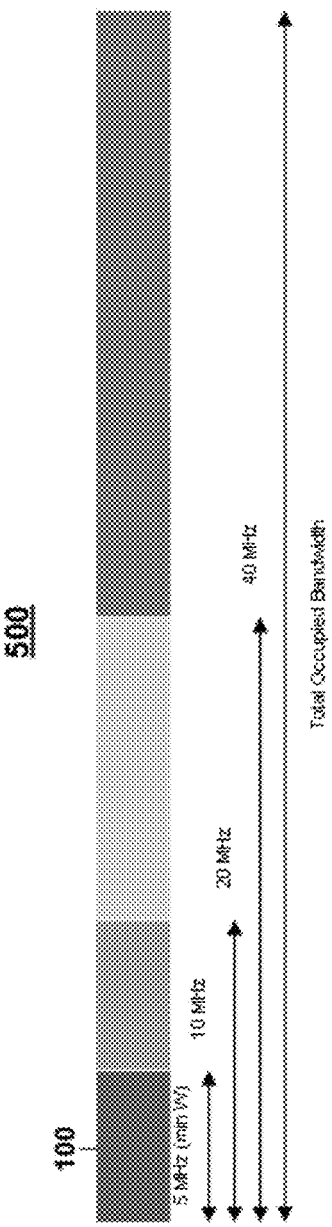
FIG. 5 illustrates a frequency-domain structure for a synchronization channel in accordance with various embodiments.

FIG. 5 illustrates an alternative embodiment of a frequency-domain structure 500 for the SSCH. As shown, occupied bandwidth by the synchronization channel (preamble) structure 100 is offset relative to the center band. It can be appreciated that the use of either the frequency-domain structure 400 or the frequency-domain structure 500 for the SSCH in IEEE 802.16m may depend on various considerations for system design.

Figure 6:
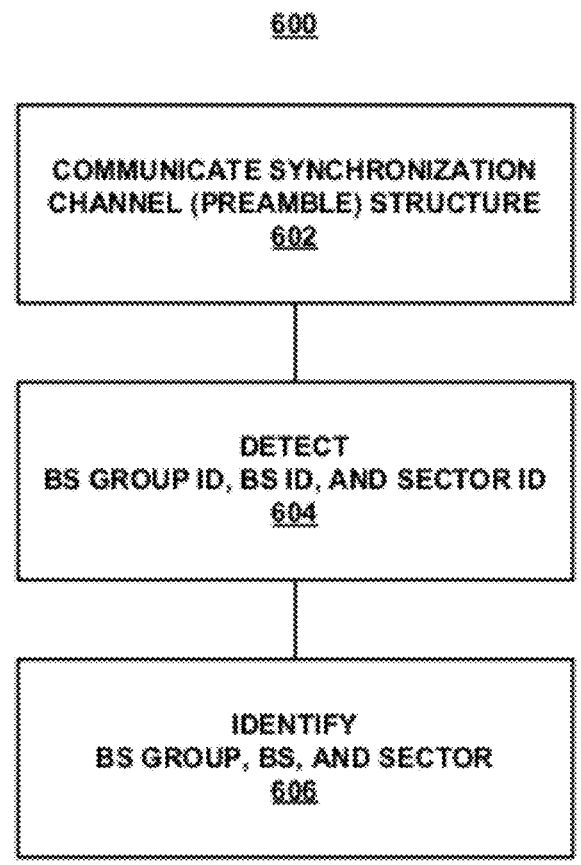
FIG. 6 illustrates a logic flow for detection of a synchronization channel (preamble) in accordance with various embodiments.

FIG. 6 illustrates one embodiment of a logic flow 600 for synchronization channel (preamble) detection. In various embodiments, logic flow 600 may be performed by various systems and/or devices and may be implemented as hardware, software, firmware, and/or any combination thereof, as desired for a given set of design parameters. For example, logic flow 600 may be implemented by a logic device (e.g., computer) and/or logic (e.g., executable computer program instructions) to be executed by a logic device. For purposes of illustration, and not limitation, reference is made to FIG. 1.

The logic flow 600 may comprise communicating a synchronization channel (preamble) structure 100 (block 602). In various embodiments, the synchronization channel (preamble) structure comprises a base station group identifier field to store a base station group identifier comprising k bits, a base station identifier field to store a base station identifier comprising m bits, and a sector identifier field to store a sector identifier comprising n bits.

The logic flow 600 may comprise detecting a particular base station group identifier, a particular base station identifier, and a particular sector identifier (block 604) and identifying a particular base station group, a particular base station, and a particular sector (block 606). In various embodiments, the base station group identifier, the base station identifier, and the sector identifier may be detected in a single step, and the base station group, the base station, and the sector may be identified by performing a maximum number of $2^k+2^m+2^n$ comparisons (e.g., cross-correlations).

It can be appreciated that the logic flow 600 may include various other steps in accordance with the described embodiments such as associating the base station group identifier with a paging group, determining a handoff condition and initiating a handoff procedure based on a change in one or more sections of the preamble, and/or tracking the rate of change in one or more sections of the preamble to improve correct detection of the preamble sequence.

Figure 7:
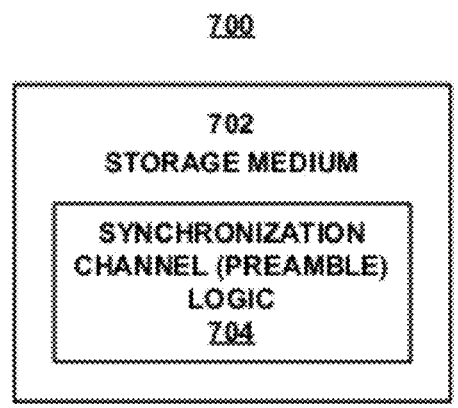
FIG. 7 illustrates an article of manufacture storing synchronization channel preamble logic in accordance with various embodiments.

FIG. 7 illustrates one embodiment of an article of manufacture 700. As shown, article 700 may comprise a computer-readable storage medium 702 to store synchronization channel preamble logic 704. Article 700 may be implemented by various systems and/or devices in accordance with the described embodiments.

Article 700 and/or computer-readable storage medium 702 may include one or more types of computer-readable storage media capable of storing data, including volatile memory or, non-volatile memory, removable or non-removable memory, erasable or non-erasable memory, writeable or re-writeable memory, and so forth. Article 700 and/or computer-readable storage medium 702 may store synchronization channel preamble logic 504 comprising executable computer program instructions that, when executed by a computer, cause the computer to perform methods and/or operations in accordance with the described embodiments.

Synchronization channel (preamble) logic 704 may comprise, or be implemented as, software, firmware, a module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "one embodiment," or "an embodiment" means that a particular feature, structure, or characteristic described in connection with the embodiment is included in at least one embodiment. Thus, appearances of the phrases "in various embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, or any combination thereof.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A packet data structure stored on a non-transitory computer-readable-storage medium for carrying a synchronization channel or preamble binary sequence to be detected by a mobile station, the packet data structure comprising:

a synchronization channel or preamble structure comprising a base station group identifier field to store a base station group identifier comprising k bits, a base station identifier field to store a base station identifier comprising m bits, and a sector identifier field to store a sector identifier comprising n bits, the synchronization channel or preamble structure to allow the mobile station to detect a particular base station group identifier, a particular base station identifier, and a particular sector identifier from the binary sequence in a single step or scan and to allow the mobile station to track the rate of change for one or more of the base station group identifier, the base station identifier, and the sector identifier for error detection, the synchronization channel or preamble structure to be implemented by a synchronization channel comprising a supplemental synchronization channel offset within a frame from a primary synchronization channel by a fixed number of symbols controlled by a system parameter that defines a value specifying a position of the supplemental synchronization channel relative to the primary synchronization channel.

2. The packet data structure of claim 1, the synchronization channel or preamble structure arranged to carry (k+m+n) bits of information and support $2^{(k+m+n)}$ unique preamble sequences.

3. The packet data structure of claim 1, the synchronization channel or preamble structure to allow the mobile station to identify a particular base station group, a particular base station, and a particular sector from the binary sequence by performing a maximum number of $2^k+2^m+2^n$ comparisons.

4. The packet data structure of claim 1, the synchronization channel or preamble structure to allow the mobile station to search for and identify a particular base station group by comparing the k bits of the binary sequence to known k-bit sequences of base station groups and using a maximum number of $2^k$ comparisons to identify the particular base station group from $2^k$ base station groups.

5. The packet data structure of claim 1, the synchronization channel or preamble structure to allow the mobile station to search for and identify a particular base station by comparing the m bits of the binary sequence to known m-bit sequences of base stations and using a maximum number of $2^m$ comparisons to identify the particular base station from $2^m$ base station groups.

6. The packet data structure of claim 1, the synchronization channel or preamble structure to allow the mobile station to search for and identify a particular sector by comparing the n bits of the binary sequence to known n-bit sequences of sectors and using a maximum number of $2^n$ comparisons to identify the particular sector from $2^n$ sectors.

7. The packet data structure of claim 1, the synchronization channel or preamble structure to allow the mobile station to associate the base station group identifier with a paging group or paging group identifier.

8. The packet data structure of claim 1, the synchronization channel or preamble structure to allow the mobile station to detect a handoff condition and initiate a handoff.

9. The packet data structure of claim 1, the synchronization channel to appear in every frame or in every certain number of frames.

10. The packet data structure of claim 1, the synchronization channel to span a minimum system bandwidth and to be centered at the system bandwidth or offset relative to a center band of the system bandwidth.

11. An apparatus comprising:
a wireless device to communicate a packet data structure including a synchronization channel or preamble structure comprising a base station group identifier field to store a base station group identifier comprising k bits, a base station identifier field to store a base station identifier comprising m bits, and a sector identifier field to store a sector identifier comprising n bits, the synchronization channel or preamble structure to allow a mobile station to detect a particular base station group identifier, a particular base station identifier, and a particular sector identifier from the binary sequence in a single step or scan and to allow the mobile station to track the rate of change for one or more of the base station group identifier, the base station identifier, and the sector identifier for error detection, the synchronization channel or preamble structure to be implemented by a synchronization channel comprising a supplemental synchronization channel offset within a frame from a primary synchronization channel by a fixed number of symbols controlled by a system parameter that defines a value specifying a position of the supplemental synchronization channel relative to the primary synchronization channel.

12. The apparatus of claim 11, the wireless device to operate in accordance with one or more Institute for Electronic and Electrical Engineers (IEEE) standards comprising one or more of IEEE 802.16e-2005 and IEEE 802.16m.

13. A system comprising the apparatus of claim 11 coupled to an antenna for receiving the packet data structure transmitted by a base station over an air interface.

14. A method comprising:
communicating a packet data structure including a synchronization channel or preamble structure comprising a base station group identifier field to store a base station group identifier comprising k bits, a base station identifier field to store a base station identifier comprising m bits, and a sector identifier field to store a sector identifier comprising n bits, the synchronization channel or preamble structure to be implemented by a synchronization channel comprising a supplemental synchronization channel offset within a frame from a primary synchronization channel by a fixed number of symbols controlled by a system parameter that defines a value specifying a position of the supplemental synchronization channel relative to the primary synchronization channel;

detecting a particular base station group identifier, a particular base station identifier, and a particular sector identifier from the binary sequence in a single step or scan; and tracking the rate of change for one or more of the base station group identifier, the base station identifier, and the sector identifier for error detection.

15. The method of claim 14, further comprising identifying a particular base station group, a particular base station, and a particular sector from the binary sequence by performing a maximum number of $2^k+2^m+2^n$ comparisons.

16. An article of manufacture comprising:
a non-transitory computer-readable storage medium storing executable computer program instructions that when executed by a computer cause the computer to perform the method of claim 14.

* * * * *